United States Patent
Iwasaki

(10) Patent No.: US 10,116,171 B2
(45) Date of Patent: Oct. 30, 2018

(54) POWER RECEIVING APPARATUS AND METHOD FOR PREVENTING UNFAIR USE

(71) Applicant: TOSHIBA TEC KABUSHIKI KAISHA, Shinagawa-ku, Tokyo (JP)

(72) Inventor: Hiroshi Iwasaki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 15/180,176

(22) Filed: Jun. 13, 2016

(65) Prior Publication Data
US 2017/0077766 A1 Mar. 16, 2017

(30) Foreign Application Priority Data
Sep. 15, 2015 (JP) .................................. 2015-182108

(51) Int. Cl.
 H02J 50/12 (2016.01)
 H02J 50/80 (2016.01)

(52) U.S. Cl.
 CPC .............. *H02J 50/80* (2016.02); *H02J 50/12* (2016.02)

(58) Field of Classification Search
None
See application file for complete search history.

(56) References Cited

U.S. PATENT DOCUMENTS

| 2009/0106137 A1* | 4/2009 | Ochi ...................... G06Q 40/00 705/35 |
| 2012/0049646 A1 | 3/2012 | Teramoto et al. |
| 2013/0257365 A1* | 10/2013 | Redding ................. H02J 5/005 320/108 |

(Continued)

FOREIGN PATENT DOCUMENTS

| JP | 2005-071198 | 3/2005 |
| JP | 2006-060909 | 3/2006 |
| JP | 2010-104098 | 5/2010 |
| JP | 2011-061893 | 3/2011 |
| JP | 2011-081475 | 4/2011 |

(Continued)

OTHER PUBLICATIONS

Japanese Office Action for Japanese Patent Application No. 2015-182108 dated Dec. 19, 2017.

(Continued)

*Primary Examiner* — Jared Fureman
*Assistant Examiner* — Aqeel Bukhari
(74) *Attorney, Agent, or Firm* — Amin, Turocy & Watson LLP

(57) ABSTRACT

A power receiving apparatus carried in an electronic device comprises a power receiving module configured to receive electric power supplied from a power supply apparatus in a non-contact manner; a supply module configured to supply the electric power received by the power receiving module to a power load section of the electronic device; an acquisition module configured to acquire identification information for identifying the power supply apparatus from the power supply apparatus; a determination module configured to determine whether the identification information acquired by the acquisition module is coincident with preset identification information; and a control module configured to suppress the electric power supplied to the power load section if the determination module determines that the identification information is not coincident with the preset identification information.

5 Claims, 3 Drawing Sheets

(56) References Cited

U.S. PATENT DOCUMENTS

| | | |
|---|---|---|
| 2014/0015481 A1 | 1/2014 | Nonaka |
| 2014/0159646 A1* | 6/2014 | Sankar .................... H02J 17/00 320/107 |
| 2015/0006395 A1 | 1/2015 | Chu |
| 2016/0149435 A1 | 5/2016 | Nago |

FOREIGN PATENT DOCUMENTS

| | | |
|---|---|---|
| JP | 2011-227557 | 11/2011 |
| JP | 2012-075302 | 4/2012 |
| JP | 2012-213297 | 11/2012 |
| JP | 2015-008619 | 1/2015 |

OTHER PUBLICATIONS

Japanese Office Action for Japanese Patent Application No. 2015-182108 dated Aug. 7, 2018.

* cited by examiner

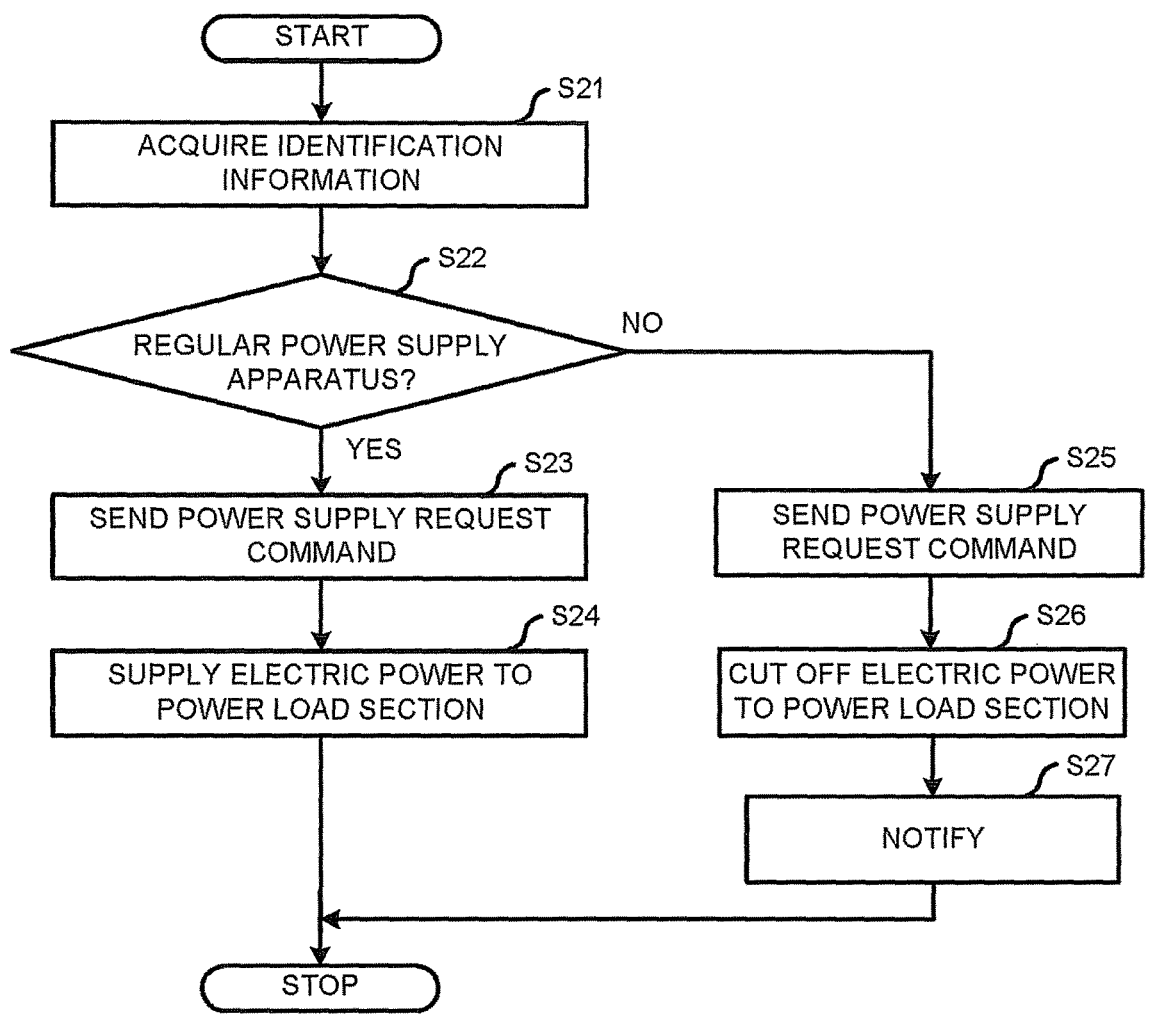

POWER RECEIVING APPARATUS AND METHOD FOR PREVENTING UNFAIR USE

CROSS-REFERENCE TO RELATED APPLICATION

This application is based upon and claims the benefit of priority from Japanese Patent Application No. 2015-182108, filed Sep. 15, 2015, the entire contents of which are incorporated herein by reference.

FIELD

Embodiments described herein relate generally to a power receiving apparatus and methods for preventing unfair use.

BACKGROUND

Conventionally, as a power supply method for enabling an electronic device to operate, a method of supplying electric power from an external device in a wired manner and a method for supplying electric power from a built-in battery are mainly employed. In recent years, a non-contact power supply technology, in which a physical phenomenon such as electromagnetic induction or magnetic resonance is applied, is introduced. An electronic device is equipped with a power receiving apparatus corresponding to the non-contact power supply technology, and thus, the supply of electric power can be delivered in a cableless manner. In recent years, an electronic device having a wireless communication function such as a wireless LAN or Bluetooth® Technology becomes popular and cases in which the electronic device carries the foregoing power receiving apparatus to receive electric power in a completely cableless manner are increased.

Incidentally, the electronic device receiving electric power in a cableless manner has an advantage in that it can be used at a comparatively free position as there is no cable restricting movement. However, as it is possible that the electronic device is simply taken away due to the advantage, there are concerns that the electronic device is stolen by a third person. Thus, a technology is desired which can prevent an unfair use of the electronic device even if the electronic device is stolen by a third person.

DESCRIPTION OF THE DRAWINGS

FIG. 4 is a flowchart illustrating another example of a power receiving control processing executed by the power receiving apparatus according to the embodiment.

DETAILED DESCRIPTION

According to an embodiment, a power receiving apparatus which is a power receiving apparatus housed in an electronic device comprises a power receiving module, a supply module, an acquisition module, a determination module and a control module. The power receiving module receives electric power supplied from a power supply apparatus in a non-contact manner. The supply module supplies the electric power received by the power receiving module to a power load section. The acquisition module acquires identification information for identifying the power supply apparatus from the power supply apparatus. The determination module determines whether the identification information acquired by the acquisition module is coincident with preset identification information. The control module suppresses the electric power supplied to the power load section if the determination module determines that the identification information is not coincident with the preset identification information.

Hereinafter, with reference to the accompanying drawings, embodiments of the power receiving apparatus and methods for preventing unfair or unauthorized use are described in detail. Further, the embodiment described later is only one embodiment of the power receiving apparatus and the method for preventing unfair use, and does not limit the constitution or specification thereof.

Figure 1:
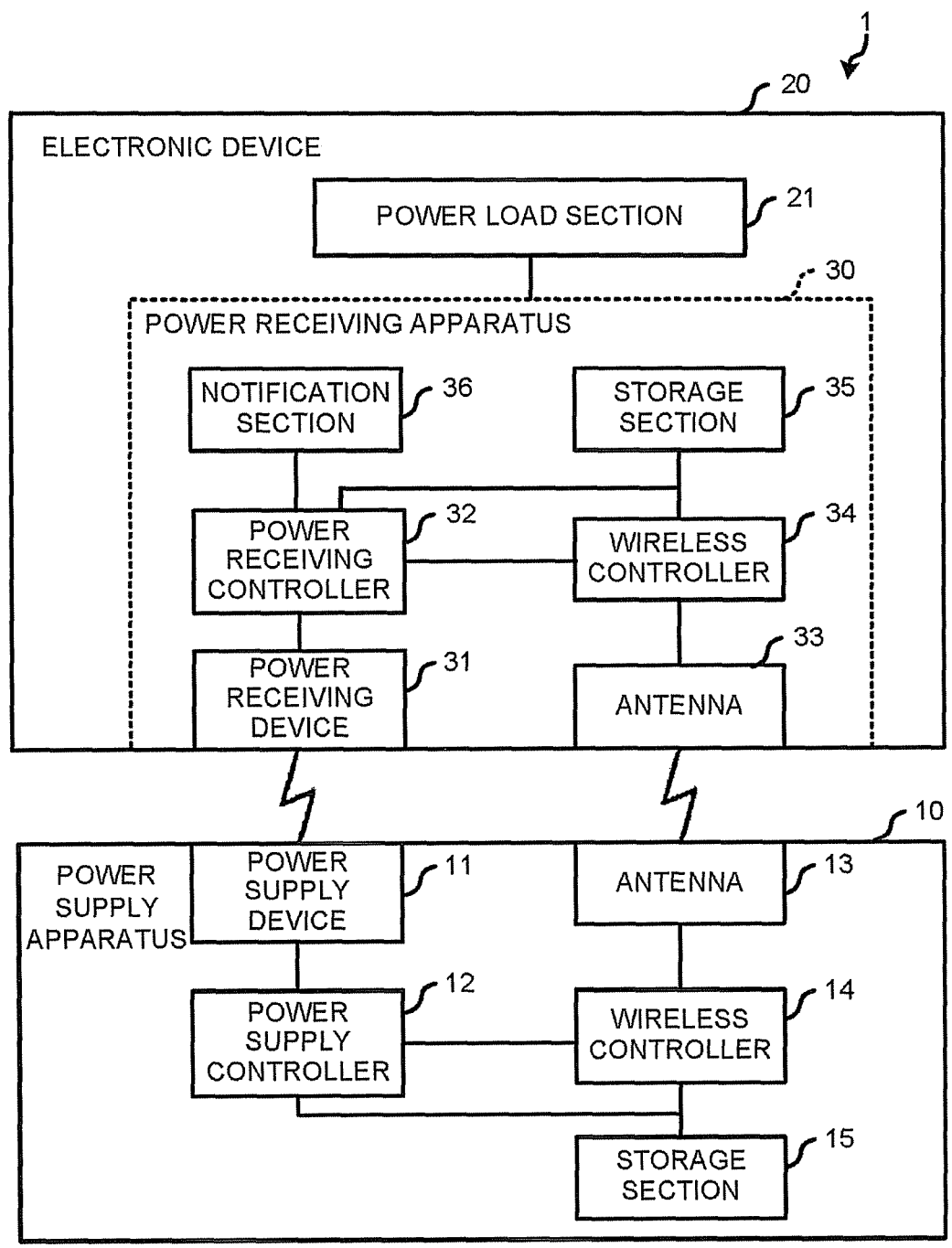
FIG. 1 is a diagram illustrating an example of the structure of a non-contact power supply system according to an embodiment.

FIG. 1 is a diagram illustrating an example of the structure of a non-contact power supply system according to the embodiment. As shown in FIG. 1, the non-contact power supply system 1 includes a power supply apparatus 10 and an electronic device 20.

The power supply apparatus 10 is a power supply apparatus of a non-contact power supply method which can supply electric power (electric power transmission) in a non-contact manner. Non-contact means wires and/or conductive metal contacts between the two are not used. The electronic device 20 is, for example, a printer, a code scanner or a display device used in a retail store. The electronic device 20 can be handheld (mobile) or tabletop (stationary). Further, the electronic device 20 carries an under-mentioned power receiving apparatus 30 which can receive the electric power supplied from the power supply apparatus 10. The electronic device 20 operates using the electric power received by the power receiving apparatus 30. The non-contact power supply method of the power supply apparatus 10 is not specifically limited, and may be, for example, an electromagnetic induction method, an electromagnetic field resonance method, a radio wave method or the like.

The power supply apparatus 10, as shown in FIG. 1, includes a power supply device 11, a power supply controller 12, an antenna 13, a wireless controller 14 and a storage section 15.

The power supply device 11 is used to supply electric power in a non-contact manner. Further, it is assumed that the power supply device 11 and the power supply controller 12 each include a device (such as coil, resonator or the like) conforming to the adopted non-contact power supply method. The power supply controller 12 is used to control the supply of the electric power by the power supply device 11.

The antenna 13 is a wireless antenna for executing wireless communication. The wireless controller 14 is used to control the wireless communication executed by the antenna 13. Further, FIG. 1 illustrates that the antenna 13 and the wireless controller 14 are separately arranged; however, it is not limited to this structure. For example, it is applicable that a coil equipped by the power supply device 11 functions as the antenna 13 and the power supply controller 12 has a function of the wireless controller 14.

The storage section 15, which can be a non-volatile storage medium stores various information. In the present embodiment, the storage section 15 stores identification information associated with the specific power supply apparatus 10. Herein, the identification information is used to identify an individual or a product of the power supply apparatus 10. The identification information may be, for example, a manufacture number or a product code of the power supply apparatus 10. Further, the storage section 15 may store specification and the like relating to the power supply as setting information.

In the power supply apparatus 10 with the foregoing structure, operations at the time of starting the power supply are, for example, as follows. First, if there is an electronic device 20 in an area capable of supplying the electric power of the power supply device 11, the wireless controller 14 transmits the identification information stored in the storage section 15 to the electronic device 20 via the antenna 13. After the transmission of the identification information, if receiving a power supply request command from the electronic device 20, the power supply controller 12 controls the power supply device 11 to start the power supply (main power supply) to the electronic device 20. Further, before starting the main power supply to the electronic device 20, the power supply controller 12 supplies small electric power (test power supply) through which the operation of the under-mentioned power receiving apparatus 30 is enabled to the electronic device 20. Through the test power supply, the power receiving apparatus 30 is activated.

On the other hand, the electronic device 20, as shown in FIG. 1, comprises a power load section 21 and the power receiving apparatus 30.

The power load section 21 serving as a function section for realizing the main functions of the electronic device 20 operates through the electric power supplied from the power receiving apparatus 30. For example, in a case in which the electronic device 20 is a printer, the power load section 21 corresponds to a printer engine or a printer controller for realizing functions of the printer.

The power receiving apparatus 30 includes a power receiving device 31, a power receiving controller 32, an antenna 33, a wireless controller 34, a storage section 35 and a notification section 36.

The power receiving device 31 includes a device for receiving the electric power supplied from the power supply apparatus 10. The power receiving device 31 includes a device for supplying the received electric power to the power load section 21. Further, the power receiving device 31 includes a device (such as a coil, rectifier or the like) conforming to the adopted non-contact power supply method.

The power receiving controller 32 is used to control the power reception and the power supply by the power receiving device 31. Specifically, the power receiving controller 32 enables the power supply apparatus 10 to start the power supply through transmitting the power supply request command to the power supply apparatus 10 via the wireless controller 34. Further, a switch element (not shown) for starting or terminating the supply of the electric power is arranged in a supply line for supplying the electric power from the power receiving device 31 to the power load section 21.

The antenna 33 can be a wireless antenna for executing wireless communication. The wireless controller 34 is used to control the wireless communication executed by the antenna 33. Further, FIG. 1 illustrates that the antenna 33 and the wireless controller 34 are separately arranged; however, it is not limited to this structure. For example, it may be applicable that a coil equipped in the power receiving device 31 functions as the antenna 33 and the power receiving controller 32 has a function of the wireless controller 34.

The storage section 35, which can be a non-volatile storage medium, stores various information. In the present embodiment, the storage section 35 stores the identification information of the power supply apparatus 10 (hereinafter, referred to as a regular power supply apparatus 10) which is permitted to supply the electric power. Herein, the regular power supply apparatus 10 can be optionally decided; however, for example, the regular power supply apparatus 10 may be a power supply apparatus 10 that is usually used such as the power supply apparatus 10 arranged in the same retail store as the power receiving apparatus 30. In this case, the power supply apparatus 10 outside the retail store becomes an irregular power supply apparatus 10. Further, the amount of the identification information (regular power supply apparatuses 10) stored in the storage section 35 is not specifically limited, and a plurality of the identification information may be stored.

The notification section 36 is a notification device for executing a notification operation. For example, the notification section 36 may be a sound output device such as a loudspeaker or a buzzer, a light emitting device such as an indicator lamp, a display device such as a liquid crystal display, or a kintic output device such as a vibrator. Further, the notification section 36 may act as a communication device for transmitting the notification information to a predetermined external device.

Figure 2:
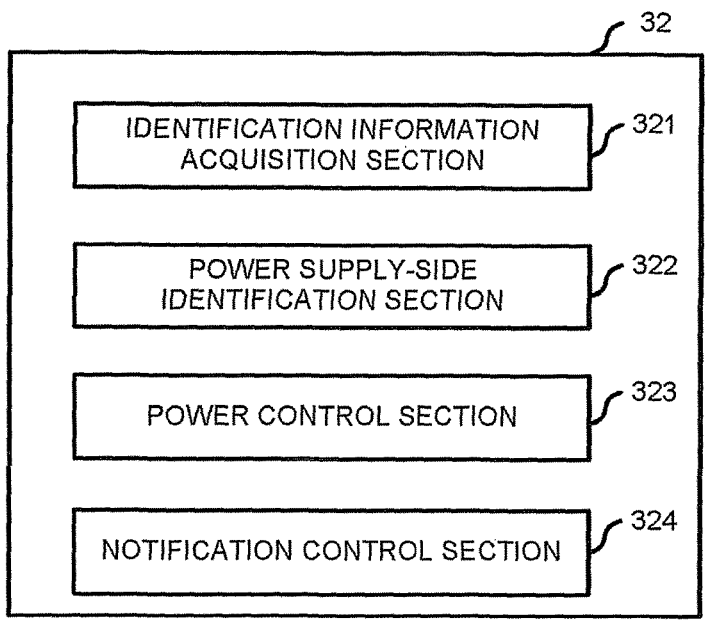
FIG. 2 is a diagram illustrating an example of functional components of a power receiving controller according to the embodiment.

Further, the foregoing power receiving controller 32 has each function section shown in FIG. 2. Herein, FIG. 2 is a diagram illustrating an example of functional components of the power receiving controller 32 according to the embodiment. As shown in FIG. 2, the power receiving controller 32 includes, as function sections, an identification information acquisition section 321, a power supply-side identification section 322, a power control section 323 and a notification control section 324. These function sections may have hardware structures embodied in a dedicated circuit or hardware structures realized through the cooperation of programs with a prescribed program.

The identification information acquisition section 321 acquires the identification information transmitted from the power supply apparatus 10. The power supply-side identification section 322 compares the identification information acquired by the identification information acquisition section 321 with the identification information stored in the storage section 35 to determine whether or not there is coincident identification information in the storage section 35. The power supply-side identification section 322, if it is determined that there is coincident identification information, identifies the power supply apparatus 10 serving as power supply origin as the regular power supply apparatus 10. Further, the power supply-side identification section 322, if it is determined that there is no coincident identification information, identifies the power supply apparatus 10 serving as power supply origin as the irregular power supply apparatus 10.

The power control section 323 is a function section for controlling the power reception and the supply of the electric power by the power receiving device 31 to each section. Specifically, the power control section 323, in a case in which the power supply-side identification section 322 identifies the power supply apparatus 10 as the regular power supply apparatus 10, controls the wireless controller 34 to transmit the power supply request command to the power supply apparatus 10. In this way, as the power supply apparatus 10 starts to supply the electric power, the power control section 323 enables the electric power received by the power receiving device 31 to be supplied to the power load section 21.

Further, the power control section 323, in a case in which the power supply-side identification section 322 identifies the power supply apparatus 10 as the irregular power supply apparatus 10, controls not to supply the electric power (driving power) to the power load section 21. Herein, the power control section 323 executes either of the two control methods as follows as a control processing of a case in which the power supply apparatus 10 is irregular.

The first control method is a method for suppressing the power supply operation of the power supply apparatus 10 (or power receiving operation of the power receiving apparatus 10). In the case of the present embodiment, the power control section 323 controls to suppress the transmission of the power supply request command so that the power supply apparatus 10 does not execute the power supply operation. In this way, as the supply of the electric power to the power load section 21 is not executed, the operation of the power load section 21 can be suppressed.

The second control method is a method of suppressing the supply of the electric power supplied from the power supply apparatus 10 to the power load section 21. In this case, the power control section 323 controls not to supply the electric power to the power load section 21 after enabling the power supply request command to be transmitted to start the power supply from the power supply apparatus 10. For example, the power control section 323 switches the switch element arranged in the supply line to the power load section 21 to "ON" to suppress the supply of the electric power to the power load section 21. In this way, as the supply of the electric power to the power load section 21 is not executed, the operation of the power load section 21 can be suppressed. In the case of the present control method, the power control section 323 may control to pass the electric power supplied from the power supply apparatus 10 onto the driving power of the notification section 36. In this way, the notification section 36 having larger power load can be used to execute a notification operation.

The notification control section 324 is a function section for controlling the operation of the notification section 36. Specifically, the notification control section 324, in a case in which the power supply-side identification section 322 identifies the power supply apparatus 10 as the regular power supply apparatus 10, sets the notification section 36 to a non-operation state. Further, the notification control section 324, in a case in which the power supply-side identification section 322 identifies the power supply apparatus 10 as the irregular power supply apparatus 10, controls the notification section 36 to execute the notification operation. Further, notification contents to be notified by the notification section 36 can be optionally set. For example, in a case in which the notification section 36 is the sound output device or the display device, a warning message blaming theft or unfair use may be output. Further, in a case in which the notification section 36 is a communication device, notification information for conveying the probability of theft may be sent.

Hereinafter, with reference to FIG. 3 and FIG. 4, operations of the electronic device 20 (the power receiving apparatus 30) with the foregoing structure are described.

Figure 3:
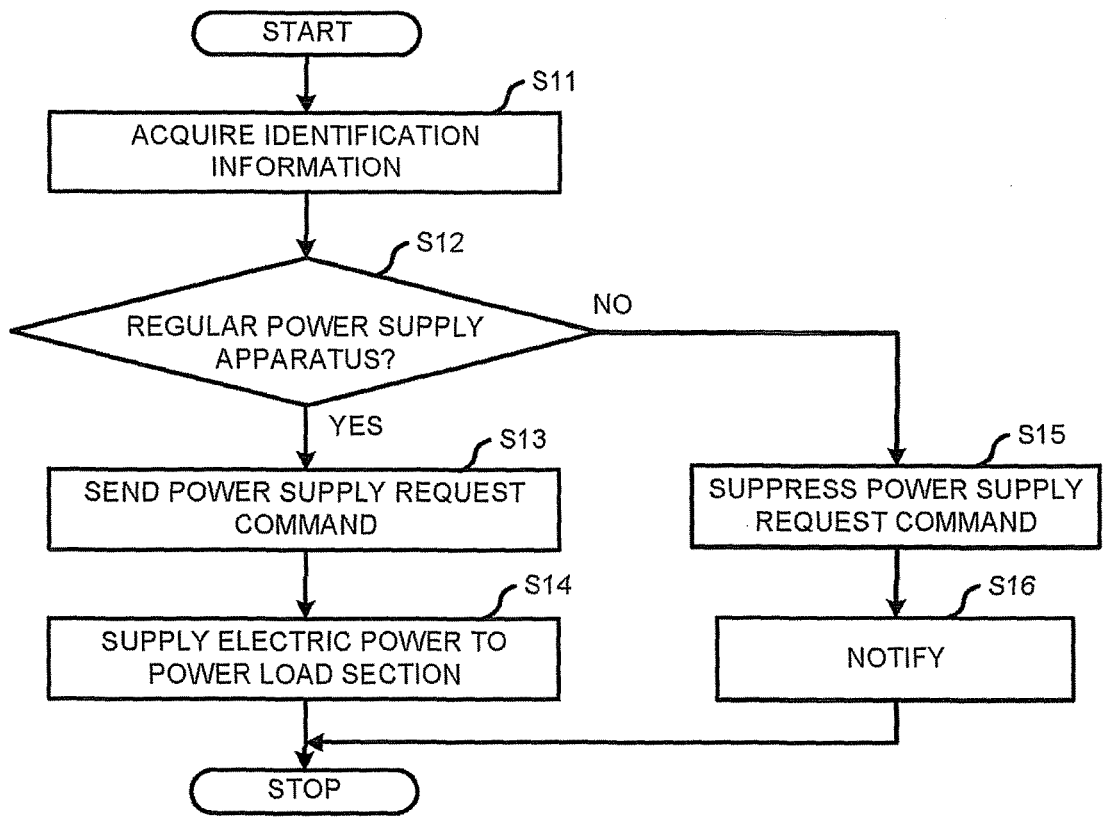
FIG. 3 is a flowchart illustrating an example of a power receiving control processing executed by the power receiving apparatus according to the embodiment.

First, with reference to FIG. 3, an example of operations based on the foregoing first control method is described. Herein, FIG. 3 is a flowchart illustrating an example of the power receiving control processing executed by the power receiving apparatus 30 according to the embodiment.

The electronic device 20 is arranged in an area capable of supplying the electric power of the power supply apparatus 10 and if the power receiving apparatus 30 is started, the identification information acquisition section 321 acquires the identification information transmitted from the power supply apparatus 10 via the wireless controller 34 (ACT S11). Next, the power supply-side identification section 322 compares the identification information acquired through the processing in ACT S11 with the identification information stored in the storage section 35 to determine whether or not the power supply origin is the regular power supply apparatus 10 (ACT S12).

In ACT S12, if it is determined that the power supply origin is the regular power supply apparatus 10 (ACT S12: Yes), the power control section 323 controls the wireless controller 34 to transmit the power supply request command to the power supply apparatus 10 (ACT S13). Next, the power control section 323 controls to supply the electric power supplied from the power supply apparatus 10 to the power load section 21 (ACT S14), and then terminates the present processing.

On the other hand, in ACT S12, if it is determined that the power supply origin is the irregular (for instance, not usual) power supply apparatus 10 (ACT S12: No), the power control section 323 suppresses the transmission of the power supply request command (ACT S15). Further, the notification control section 324 executes the notification operation with the use of the notification section 36 (ACT S16), and then terminates the present processing.

Next, with reference to FIG. 4, an example of operations based on the foregoing second control method is described. Herein, FIG. 4 is a flowchart illustrating another example of a power receiving control processing executed by the power receiving apparatus 30 according to the embodiment. Further, as the processing in ACT S21~ACT S24 is same with those in ACT S11~ACT S14, the description thereof is omitted.

In ACT S22, if it is determined that the power supply origin is the irregular power supply apparatus 10 (ACT S22: No), the power control section 323 controls the wireless controller 34 to transmit the power supply request command to the power supply apparatus 10 (ACT S25). The power control section 323 cuts off the supply of the electric power to the power load section 21 (ACT S26). Next, the notification control section 324 executes the notification operation with the use of the notification section 36 operating through the electric power supplied from the power supply apparatus 10 (ACT S27), and then terminates the present processing.

As stated above, according to the electronic device 20 (the power receiving apparatus 30) of the present embodiment, in a case in which the power supply is executed through the irregular power supply apparatus 10, through the foregoing first control method or the second control method, the supply of the electric power to the power load section 21 is suppressed. In this way, even if the electronic device 20 is taken away by a third person, as the power load section 21 does not operate in an area capable of supplying the electric power of an apparatus other than the regular power supply apparatus 10, the unfair use can be prevented. Further, according to the electronic device 20 (the power receiving apparatus 30) of the present embodiment, as the notification operation can be executed in a case in which the power supply is received from the irregular power supply apparatus 10, a warning can be given to, for example, the person who commits theft of the electronic device 20.

While certain embodiments aren described, these embodiments are presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, the electronic device 20 may be equipped with a secondary battery which can accumulate and/or store the electric power supplied from the power receiving apparatus 30. In this case, the power control section 323, in a case in which the power supply-side identification section 322 identifies the power supply apparatus 10 as the regular power supply apparatus 10, supplies the electric power supplied from the power supply apparatus 10 to the power load section 21 or the secondary battery. On the other hand, in a case of the irregular power supply apparatus 10, the power control section 323 controls to cut off the supply of the electric power to the secondary battery along with the execution of the foregoing first control method or the second control method. For example, by setting the switch element arranged in the supply line to the secondary battery to "OFF", the power control section 323 suppresses the supply of the electric power to the secondary battery. In this way, as the charge to the secondary battery cannot be executed through the irregular power supply apparatus 10, the unfair use of the electronic device 20 can be prevented.

The program executed by the power receiving apparatus 30 of the foregoing embodiment is incorporated in a storage medium (the storage section 35) equipped in the power receiving apparatus 30 to be supplied; however, it is not limited to this configuration. The program may be recorded in a computer-readable storage medium such as a CD-ROM, an FD (Flexible Disk), a CD-R or a DVD (Digital Versatile Disk) in the form of installable or executable file. Further, the storage medium is not limited to a medium independent from a computer or an embedded system, and also includes a storage medium which stores or temporarily stores programs by downloading the programs transmitted through an LAN or the internet.

Further, the programs executed by each apparatus of the foregoing embodiment is stored in a computer connected with the network and is supplied by being downloaded via the network or may be supplied or distributed via the network such as the internet.

What is claimed is:

1. A power receiving apparatus comprised in an electronic device, comprising:
   a power receiving module configured to receive electric power supplied from a power supply apparatus in a non-contact manner;
   a supply module configured to supply the electric power received by the power receiving module to a power load section of the electronic device;
   an acquisition module configured to acquire identification information for identifying the power supply apparatus from the power supply apparatus;
   a determination module configured to determine whether the identification information acquired by the acquisition module is coincident with present identification information;
   a control module configured to suppress the electric power supplied to the power load section in response to a determination by the determination module that the identification information is not coincident with the preset identification information; and
   a notification module configured to transmit notification information for notifying a predetermined external device of a probability of a theft in response to the determination by the determination module that the identification information is not coincident with the preset identification information.

2. The power receiving apparatus according to claim 1, wherein
   the control module suppresses a power supply operation of the power supply apparatus in response to the determination by the determination module that the identification information is not coincident with the preset identification information.

3. The power receiving apparatus according to claim 2, wherein
   the power receiving module transmits a command to the power supply apparatus to enable the power supply apparatus to start the power supply operation; and
   the control module suppresses transmission of the command in response to the determination by the determination module that the identification information is not coincident with the preset identification information.

4. The power receiving apparatus according to claim 1, wherein
   the power receiving module transmits a command to the power supply apparatus to enable the power supply apparatus to start a power supply operation; and
   the control module ceases supply of the electric power to the power load section from the supply module based on the command.

5. A method for preventing unfair use by a power receiving apparatus of an electronic device that supplies electric power supplied from a power supply apparatus in a non-contact manner to a power load section equipped in the electronic device, comprising:
   acquiring identification information for identifying the power supply apparatus from the power supply apparatus;
   determining whether the acquired identification information is coincident with preset identification information;
   suppressing the electric power supplied to the power load section in response to a determination that the identification information is not coincident with the present identification information; and
   transmitting notification information for notifying a predetermined external device of a probability of a theft in response to the determination that the identification information is not coincident with the preset identification information.

* * * * *